Patented June 22, 1937

2,084,626

UNITED STATES PATENT OFFICE 2,084,626

UNSATURATED ALKYLENE AMIDES AND UREIDES OF POLYHYDROXY ALIPHATIC ACIDS

Donalee L. Tabern, Lake Bluff, Ill., assignor to Abbott Laboratories, North Chicago, Ill., a corporation of Illinois No Drawing. Application May 27, 1935, Serial No. 23,719

6 Claims. (Cl. 260—124)

My invention relates to unsaturated alkylene amides and ureides of polyhydroxy aliphatic acids, said compounds being especially suitable as intermediates for the preparation of mercurated unsaturated alkylene-amides and ureides of hydroxy mono- and dibasic aliphatic acids, the latter compounds being of high value as diuretics.

Two methods of preparation have been employed: (1) the reaction of the requisite alkyl esters of the polyhydroxy acids with anhydrous or alcoholic alkylene amines, and (2) the reaction of the lactones of the acids with the alkylene amines in the presence of a suitable solvent. Both give good yields of the corresponding amides, which may or may not be further purified before use for further synthetic work, such as mercuration. The ureides are preferably prepared from the acid lactone and the requisite unsaturated urea at about 100°.

Example 1

Diallylamide of saccharic acid 15 grams of potassium acid saccharate is suspended in 100 cc. of absolute alcohol, dry hydrogen chloride passed in to approach saturation, and the potassium chloride formed is filtered off. After 24 hours the alcohol and excess acid are completely removed in a good vacuum. Ten grams of anhydrous allylamine is added, with stirring and cooling, the crystalline amide separating at once. For purification, it may be well washed with dry ether. Amide melts at 170–174° C.

The amide may also be prepared by converting potassium acid saccharate to the lactone (Ber. 54, 2653), and then reacting with allylamine and isolating as described above.

The formula of the amide so obtained is:

$$\begin{array}{c} CONHC_3H_5 \\ | \\ (CHOH)_4 \\ | \\ CONHC_3H_5 \end{array}$$

Example 2

Monoallylamide of mucic acid

Mucic acid lactone is caused to react with excess monoallylamine. The amide so obtained melts at 178–180° C.

The formula of the amide is:

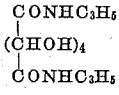
$$\begin{array}{c} COOH \\ | \\ (CHOH)_4 \\ | \\ CONHC_3H_5 \end{array}$$

Example 3

Diallylamide of mucic acid

The methyl ester of mucic acid is refluxed in alcohol with excess allylamine, a granular precipitate forming, which melts at 207–210° C. The formula of this amide is:—

$$\begin{array}{c} CONHCH_2CH=CH_2 \\ | \\ (CHOH)_4 \\ | \\ CONHCH_2CH=CH_2 \end{array}$$

Example 4

Diallylamide of trihydroxyglutaric acid

The ethyl ester of (xylo) trihydroxy glutaric acid (prepared from trihydroxy glutaric acid, methyl alcohol and hydrogen chloride) is treated with a small excess of allylamine. Heat is evolved and a solid forms at once. After heating at 60° for three hours the solid is washed with dry ether, added to a little water to remove traces of amine hydrochloride, and dried. Melting point of the ureide so formed is 168–170° C. The formula is:

$$\begin{array}{c} CONHC_3H_5 \\ | \\ (HCOH)_3 \\ | \\ CONHC_3H_5 \end{array}$$

Example 5

Monoallylamide of gluconic acid 20 grams of gluconic lactone and 10 cc. of allylamine in 75 cc. of absolute alcohol, on shaking for several hours, gives a nearly quantitative yield of the amide. Melting point 125–7° C. The formula of this amide is:

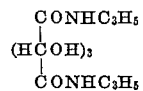
$$\begin{array}{c} CH_2OH \\ | \\ (CHOH)_4 \\ | \\ CONHCH_2CH=CH_2 \end{array}$$

Example 6

Mono B-methylallylamide of gluconic acid 1 molecular equivalent of gluconic lactone and 1.2 molecular equivalents beta-methyl allylamine are mixed in alcohol. The amide separates as bulky precipitate. It melts at 140–142° C., and has the formula:

$$\begin{array}{c} CH_2OH \\ | \\ (HCOH)_4 \\ | \\ CONHC_4H_7 \end{array}$$

EXAMPLE 7

*Beta-methyl allylamide of glucoheptonic acid*

12 grams of glucoheptonic lactone is mixed with 10 grams of beta-methyl allylamine in absolute methyl alcohol. An instantaneous reaction takes place and yields 13 grams of the glucoheptonic beta-methyl allylamide, melting at 130–133° C. The formula is:—

$$\begin{array}{c} CONH-C_4H_7 \\ | \\ (CHOH)_5 \\ | \\ CH_2OH \end{array}$$

EXAMPLE 8

*Monoallyl ureide of gluconic acid*

A similar reaction as in Example 7 ensues when equimolecular proportions of allyl urea and gluconic lactone are heated at 100° C. till a clear glass-like product is formed. This product is very soluble in water and difficult to purify, but gives no tests for free lactone or urea. It may be mercurated directly; a small amount of impurity forms an insoluble mercury addition compound, while the desired mercurated ureide is very soluble in water. The formula is:

$$\begin{array}{c} CH_2OH \\ | \\ (CHOH)_4 \quad\quad H \\ | \quad\quad\quad | \\ CO-NHCO-N-CH_2CH=CH_2 \end{array}$$

EXAMPLE 9

*Mono-allyl amide of glucoheptonic acid*

12 grams of the lactone of glucoheptonic acid and 7 grams of allylamine, on standing 10 hours and cooling, gives a crystalline precipitate of the corresponding allylamide.

Probable formula:

$$\begin{array}{c} CONH-CH_2CH=CH_2 \\ | \\ (CHOH)_5 \\ | \\ CH_2OH \end{array}$$

The following compounds have also been prepared by similar methods:

| | Melting point, degrees centigrade |
|---|---|
| Monoallylamide of galactonic acid | 180–183 |
| Monoallylamide of gulonic acid | 97–8 |
| Monoallylamide of xylonic acid | Oil |

I claim:

1. An unsaturated compound which is a member of the group consisting of alkylene amides and alkylene ureides of polyhydroxy aliphatic carboxylic acids containing more than two hydroxyl groups.

2. A polyhydroxy aliphatic carboxylic acid amide containing more than two hydroxyl groups and characterized by the presence of at least one CONHR group, wherein R is an unsaturated alkylene radical.

3. An unsaturated alkylene amide of polyhydroxy aliphatic carboxylic acid containing more than two hydroxyl groups.

4. Di-allylamide of saccharic acid.
5. Mono-allylamide of gluconic acid.
6. Di-allylamide of trihydroxyglutaric acid.

DONALEE L. TABERN.